(12) United States Patent
Thurn

(10) Patent No.: US 6,305,619 B1
(45) Date of Patent: Oct. 23, 2001

(54) PORTABLE GUN FOR DISCHARGING HIGHLY PRESSURIZED FLUID MATERIAL

(75) Inventor: Philip Patrick Thurn, Eden Park (AU)

(73) Assignee: Westfire Developments PTY LTD, Victoria (AU)

( * ) Notice: Subject to any disclaimer, the term of this patent is extended or adjusted under 35 U.S.C. 154(b) by 0 days.

(21) Appl. No.: 09/331,436

(22) PCT Filed: Dec. 17, 1997

(86) PCT No.: PCT/AU97/00851

§ 371 Date: Aug. 13, 1999

§ 102(e) Date: Aug. 13, 1999

(87) PCT Pub. No.: WO98/26876

PCT Pub. Date: Jun. 25, 1998

(30) Foreign Application Priority Data

Dec. 18, 1996 (AU) .................................................. PO 4248

(51) Int. Cl.[7] ........................................................ B05B 7/32
(52) U.S. Cl. ........................... 239/337; 239/525; 239/526; 239/152; 239/154; 239/375; 222/175; 222/394; 222/395; 222/396; 222/402.1
(58) Field of Search .................................... 239/152, 154, 239/337, 375, 525, 526; 222/175, 396, 394, 397, 395, 402.1

(56) References Cited

U.S. PATENT DOCUMENTS

| | | | |
|---|---|---|---|
| 2,258,869 | * 10/1941 | Towart, Jr. | ......................... 239/337 X |
| 2,393,346 | * 1/1946 | Stroop | ................................ 239/526 X |
| 3,730,390 | * 5/1973 | Adrian et al. | ..................... 222/402.13 |
| 3,744,717 | * 7/1973 | Kozub | .................................... 239/337 |
| 4,223,804 | 9/1980 | Morris et al. | . |
| 4,402,430 | 9/1983 | Fox et al. | . |
| 4,629,098 | * 12/1986 | Eger | ....................................... 222/175 |
| 4,895,273 | * 1/1990 | Bialy | ............................. 222/402.1 X |
| 5,458,201 | 10/1995 | Brim | . |
| 5,500,205 | * 3/1996 | Abbott et al. | ......................... 424/401 |
| 5,821,450 | * 10/1998 | Fedida | .................................. 102/370 |

FOREIGN PATENT DOCUMENTS

| | | |
|---|---|---|
| 2380435 | 8/1936 | (AU) . |
| 1240570 | 9/1971 | (AU) . |
| 4192085 | 4/1988 | (AU) . |
| WO9531290 | 11/1995 | (WO) . |

* cited by examiner

Primary Examiner—Kevin Shaver
Assistant Examiner—Robin O. Evans
(74) Attorney, Agent, or Firm—BakerBotts L.L.P.

(57) ABSTRACT

A portable gun for discharging highly pressurized fluid material such as tear gas or capsicum spray comprises an elongate refillable pressure vessel (8) for storing under pressure fluid material to be discharged. A discharge barrel (4) is coupled to the pressure vessel via a valve assembly (6) and through which the material is discharged when the valve assembly is opened by actuation of a trigger (38). The axis of the barrel is orientated in the same direction as the axis of the pressure vessel, and the gun is supported from the body of a user by a sling so that the gun can be supported with the axes of the pressure vessel and barrel generally horizontally directed.

9 Claims, 2 Drawing Sheets

PORTABLE GUN FOR DISCHARGING HIGHLY PRESSURIZED FLUID MATERIAL

Figure 1:
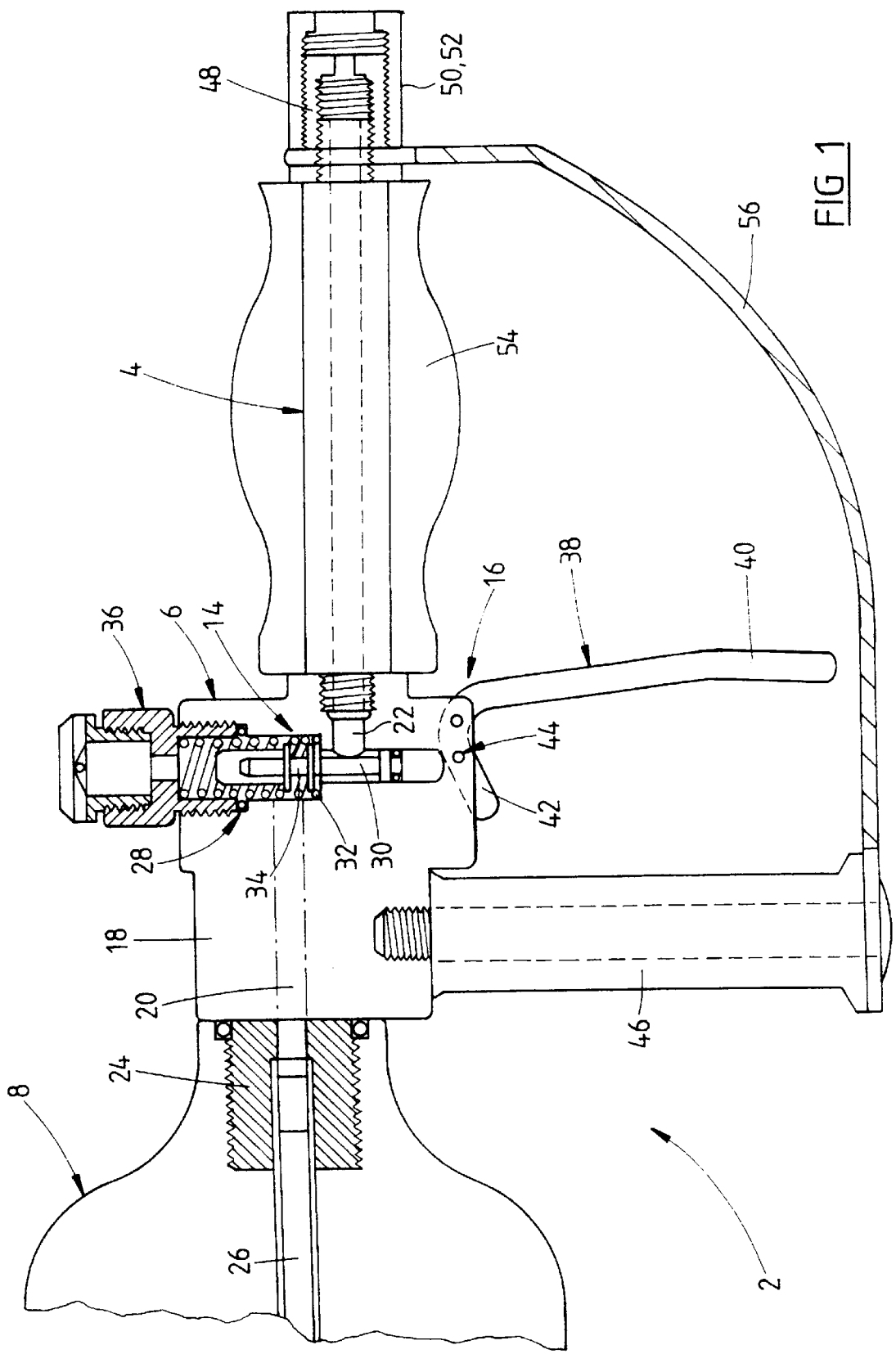

This invention relates to a portable gun for discharging highly pressurised capsicum or lachrymatory material, for use in law enforcement.

A requirement exists for a portable gun for discharging highly pressurised fluid material that is both safe and reliable in operation, yet is simple in construction and capable of being readily serviced to mart operational requirements. Such a portable gun potentially has utility for discharging fluid material in law enforcement applications.

According to the present invention, there is provided a portable gun for discharging highly pressurised capsicum or lachrymatory material for use in law enforcement, including a pressure vessel, a valve assembly connected to an outlet of the vessel for controlling discharge of the material, the valve assembly including a trigger for actuation thereof, and an elongate barrel coupled to the valve assembly for directing the discharge of the material, wherein the pressure vessel, valve assembly and barrel are adapted to be rigidly connected and wherein the pressure vessel is provided with liquefied $CO_2$ in combination with said material.

Preferably the valve assembly is removably connected to the pressure vessel to allow for replenishment of said material and is adapted to allow the pressure vessel to be recharged with liquid $CO_2$ through an outlet nozzle of the gun.

In a preferred embodiment of the invention, be gun is designed to be used in an orientation in which the longitudinal axes of the vessel and the barrel are generally horizontally directed, with the gun being carried by a sling on the body of the user so that the vessel lies between the torso of the user and an arm of the user, with the trigger being in a position to be actuable by the hand of that arm. Advantageously, the valve assembly includes a pistol grip extending from the valve assembly substantially perpendicular to the longitudinal axis of the barrel and the trigger is located adjacent the pistol grip whereby the trigger is actuable by squeezing the trigger towards the pistol grip. Advantageously, the barrel also includes a hand grip which is able to be gripped by the other hand of the user to facilitate manipulation and aiming of the gun.

Preferably, the valve assembly includes a rupture disc assembly arranged in fluid communication with the pressure vessel. The rupture disc assembly acts as a safety means to release pressure in the event that pressure in the pressure vessel exceeds a predetermined amount.

Conveniently, a trigger guard extends around the trigger from a lower portion of the pistol grip to the barrel.

Preferably, an insulating and protective sleeve substantially surrounds the vessel.

Further according to the invention, there is provided a portable gun for discharging highly pressurised fluid material such as tear gas or capsicum spray, said gun including an elongate refillable pressure vessel for storing under pressure fluid material to be discharged, a valve assembly coupled to an outlet of the pressure vessel, and a discharge barrel coupled to the pressure vessel via the valve assembly and through which the material is discharged when the valve assembly is opened, the longitudinal axis of the barrel being orientated in the same direction as the longitudinal axis of the pressure vessel, a manually-operable trigger coupled to the valve assembly for opening and closing the valve assembly, and a sling for supporting the gun from the body of a user so that the gun can be supported from the user's body with the pressure vessel lying between the torso of the user and an arm of the user and with the longitudinal axes of the pressure vessel and barrel being generally horizontally directed.

Figure 2:
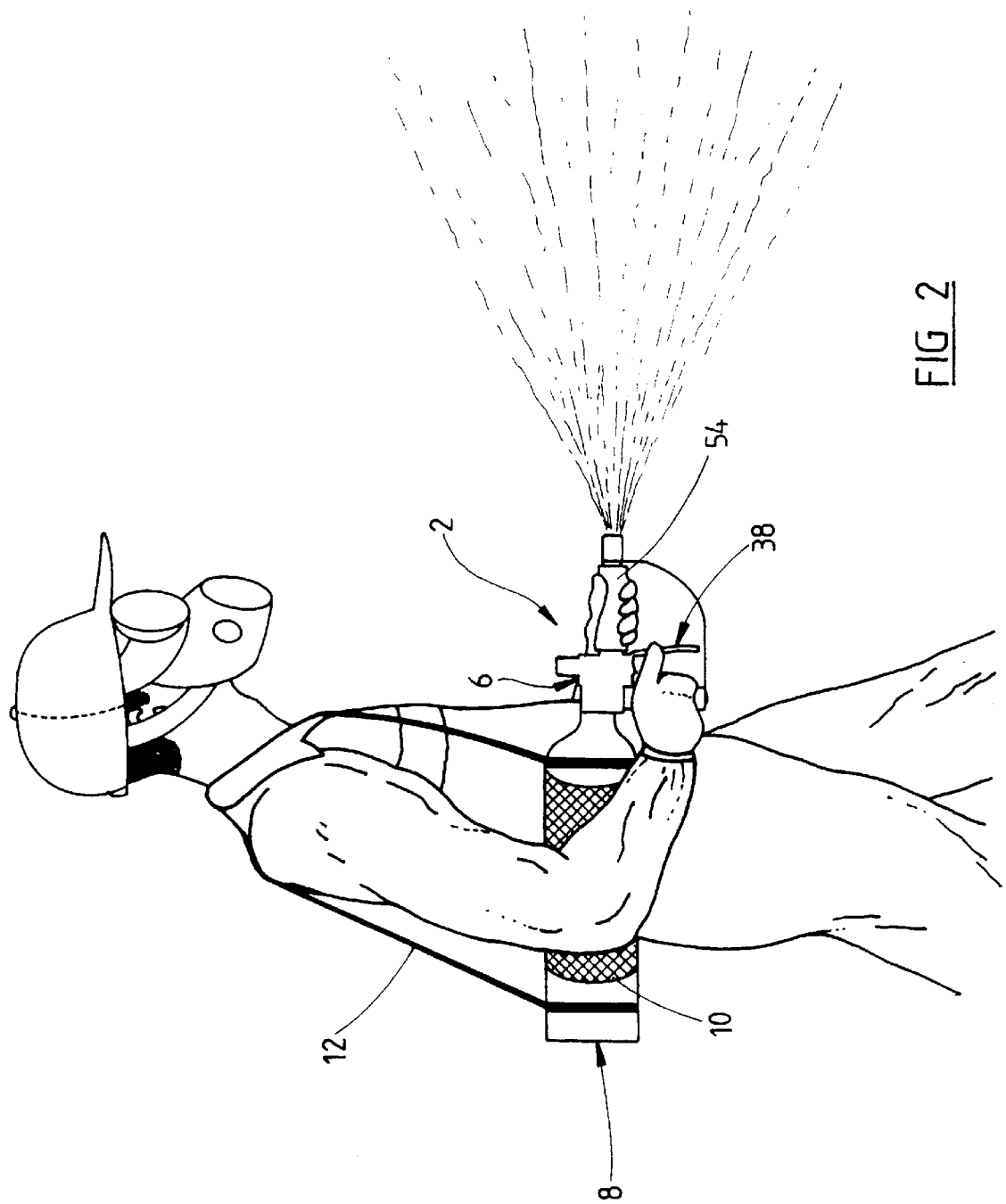

An embodiment of the invention will now be described by way of example only with reference to the accompanying drawings in which:

FIG. 1 is a side view of a portable gun for discharging highly pressurised fluid material according to a preferred embodiment of the invention; and FIG. 2 illustrates the embodiment of FIG. 1 in use.

As shown in the accompanying FIG. 1, a portable gun 2 for discharging highly pressurised fluid material in accordance with the preferred embodiment of the invention includes a barrel 4, a valve assembly 6, and a pressure vessel 8 for storing fluid material at high pressure.

The vessel 8 is cylindrical and has an opening and a neck provided at its first end, and is closed at its second opposite end. The vessel 8 is capable of withstanding high pressures, for example in the order of 15 MPA. As illustrated in FIG. 2, an insulating and protective sleeve 10 substantially surrounds the vessel 8, and a sling 12 is connected to the first and second opposite ends of the vessel 8 to enable the portable gun 2 to be supported in a generally horizontal orientation.

The valve assembly 6 includes a check valve 14, a trigger assembly 16, and a body 18 having an inlet port 20 extending in a first direction for fluid communication with the vessel 8, and an outlet port 22 that is vertically offset from the inlet port 20 and extends in a second opposite direction for fluid communication with the barrel 4. The inlet port 20 extends into a threaded spigot 24 provided on the body 18 for removably mounting in the neck of the vessel 8. An annular groove is provided at the junction of the body 18 and the spigot 24 to receive an O-ring that seals against the top face of the neck of the vessel 8. A syphon tube 26 is fitted to the spigot 24 to extract fluid material from the lowest point at the closed end of the vessel 8 in conventional fashion.

The check valve 14 is provided in an opening 28 that extends through the body 18 perpendicular to, and in fluid communication with, the inlet port 20 and outlet port 22. The check valve 14 comprises a spring-loaded spindle 30 with a seal 32 arranged in the opening 28 and a seat 34 positioned between the inlet port 20 and outlet port 22. A rupture disc assembly 36 is threadedly mounted at the upper end of the opening 28. The rupture disc assembly 36 is in fluid communication with the inlet port 20 and acts as a safety means to release pressure in the event that pressure in the inlet port 20 exceeds a predetermined amount.

The trigger assembly 16 includes a trigger 38 having an elongate major portion 40 formed generally perpendicular to an elongate minor portion 42. The trigger 38 is pivotally mounted in the body 18 such that the minor portion 42 of the trigger 38 bears against the lower end of the spring-loaded spindle 30 and the major portion 40 of the trigger 38 extends generally perpendicular to the bottom surface of the body 18. An O-ring is provided on a lower end portion of the spring-loaded spindle 30 to seal the opening 28. The trigger assembly 16 further includes safety means 44 to prevent the trigger 38 from pivoting with respect to the body 18. The safety means 44 includes holes that extend laterally through both the body 18 and the minor portion 42 of the trigger 38 for removably receiving a complementary locking pin.

A pistol grip 46 is removably connected to the bottom surface of the body 18 and is arranged such that it extends in a direction generally perpendicular to the longitudinal axis of the barrel 4.

The barrel 4 is externally threaded at both ends with one end threadedly engaging the outlet port 22 of the valve assembly 6 and the other end threadedly engaging a diffuser nozzle 48. The diffuser nozzle 48 has an external thread that accepts a muzzle 50 and thread protection nut 52. It will be appreciated that the diffuser nozzle 48 may be interchanged by means of the nut 52 for other types of nozzles having a suitable orifice size or configuration to suit a predetermined stream pattern for the fluid material to be dispersed, such as a steady stream or spray. A grip 54 surrounds the barrel 4 between the diffuser nozzle 48 and the valve assembly 6 to insulate and protect the barrel 4. A trigger guard 56 extends around the trigger assembly 16 from a lower portion of the pistol grip 46 to the portion of the barrel 4 between the grip 54 and the diffuser nozzle 48. It will be appreciated that the nut 52 retains the trigger guard 56 in place.

In use, the sling 12 is placed over a user's shoulder such that the portable gun 2 is supported in a generally horizontal orientation. The gun 2 is aimed by the user placing one hand on the pistol grip 46 and placing the other hand on the grip 54 provided on the barrel 4. The gun 2 may then be operated in conventional fashion by squeezing the trigger 38 to depress the spring-loaded spindle 30 in the valve assembly 6, thereby causing the seat 32 to lift off its seat 34 to disperse the highly pressurised fluid material from the diffuser nozzle 48. As illustrated in FIG. 2, the general arrangement of the vessel 8 with respect to the valve assembly 6 and barrel 4 allows the portable gun 2 to be aimed and fired from the hip. The grip 54 and the protective sleeve 10 insulate the user from any cooling of the barrel 4 and vessel 8, respectively, that may occur during and/or after prolonged discharges of fluid material that includes a liquefied gas, such as liquefied carbon dioxide.

After use, the gun 2 may be serviced to meet operational requirements by removing the valve assembly 6 from the vessel 8 and replenishing the fluid material. Depending on the specific application, the fluid material advantageously includes an active agent such as lachrymatory material, fire extinguishant or insecticide. After replenishment of the fluid material, the valve assembly 6 is remounted on the vessel 8 and nut 52 is removed. An adaptor is then connected to the diffuser nozzle 48 to facilitate charging with liquefied carbon dioxide gas to a prescribed weight. After replacement of the muzzle protection nut 52 the gun 2 may be reused to disperse highly pressurised fluid material in the manner described above.

In view of the foregoing, it will be appreciated that preferred embodiments of the present invention provide a portable gun for discharging highly pressurised fluid material that is both safe and reliable in operation, yet is simple in construction and capable of being readily serviced to meet operational requirements.

The above embodiment has been described by way of example only and modifications are possible within the scope of the invention.

Throughout this specification and claims which follow, unless the context requires otherwise, the word "comprise", or variations such as "comprises" or "comprising", will be understood to imply the inclusion of a stated integer or group of integers but not the exclusion of any other integer or group of integers.

What is claimed is:

1. A portable gun for discharging highly pressurised capsicum or lachrymatory material for use in law enforcement, including a pressure vessel, a valve assembly connected to an outlet of the vessel for controlling discharge of the material, the valve assembly including a trigger for actuation thereof, and an elongate barrel coupled to the valve assembly for directing the discharge of the material, wherein the pressure vessel, valve assembly and barrel are adapted to be rigidly connected and wherein the pressure vessel is provided with liquefied $CO_2$ in combination with said material.

2. A portable gun as claimed in claim 1, wherein the valve assembly is removably connected to the pressure vessel to allow for replenishment of said material and is adapted to allow the pressure vessel to be recharge with liquid $CO_2$ through an outlet nozzle of ie gun.

3. A gun according to claim 1, wherein the configuration is such that the gun can be used in an orientation in which longitudinal axes of the vessel and the barrel are generally horizontally directed, with the gun being carried by a sling on the body of the user so that me vessel lies between the torso of the user and an arm of the user, and with the trigger being in a position to be actuable by the hand of that arm.

4. A gun according to claim 3, wherein a pistol grip extends from the valve assembly substantially perpendicular to the longitudinal axis of the barrel and the trigger is located adjacent the pistol grip whereby the trigger is actuable by squeezing the trigger towards the pistol grip.

5. A gun according to claim 3, wherein the barrel also includes a hand grip which is able to be gripped by the other hand of the user to facilitate manipulation and aiming of the gun.

6. A gun according to claim 1, wherein the valve assembly includes a rupture disc assembly arranged in fluid communication with the pressure vessel, the rupture disc assembly acting as a safety means to release pressure in the event that pressure in the pressure vessel exceeds a predetermined amount.

7. A gun according to claim 1, comprising an insulating and protective sleeve substantially surrounding the vessel.

8. A portable gun for discharging highly pressurised capsicum or lachrymatory material for use in law enforcement, said gun including an elongate refillable pressure vessel for storing under pressure liquefied $CO_2$ in combination with said material to be discharged, a valve assembly coupled to an outlet of the pressure vessel, and a discharge barrel coupled to the pressure vessel via the valve assembly and through which the material is discharged when the valve assembly is opened, the longitudinal axis of the barrel being orientated in the same direction as the longitudinal axis of the pressure vessel, a manually-operable trigger coupled to the valve assembly for opening and closing the valve assembly, and a sling for supporting the gun from the body of a user so that the gun can be supported from the user's body with the pressure vessel lying between the torso of the user and an arm of the user and with the longitudinal axes of the pressure vessel and barrel being generally horizontally directed.

9. A gun according to claim 8, wherein a pistol grip extends substantially perpendicular to the longitudinal axis of the barrel and the trigger is located adjacent be grip and is actuable by squeezing the trigger towards the grip.

* * * * *